(12) United States Patent
Numata

(10) Patent No.: US 11,138,764 B2
(45) Date of Patent: Oct. 5, 2021

(54) IMAGE PROCESSING DEVICE, IMAGE PROCESSING METHOD, AND RECORDING MEDIUM

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 16/554,729

(22) Filed: Aug. 29, 2019

(65) Prior Publication Data

US 2020/0098148 A1    Mar. 26, 2020

(51) Int. Cl.
| | | |
|---|---|---|
| *G06T 11/00* | (2006.01) | |
| *G06T 3/40* | (2006.01) | |
| *G06T 5/00* | (2006.01) | |

(52) U.S. Cl.
CPC .............. *G06T 11/001* (2013.01); *G06T 3/40* (2013.01); *G06T 5/003* (2013.01); *G06T 2207/10048* (2013.01); *G06T 2207/20092* (2013.01); *G06T 2207/20212* (2013.01)

(58) Field of Classification Search
CPC ......... G06T 11/001; G06T 3/40; G06T 5/003; G06T 2207/10048; G06T 2207/20092; G06T 2207/20212; H04N 9/09; H04N 5/332; H04N 5/23232; H04N 5/23212; H04N 5/2355
See application file for complete search history.

(56) References Cited

U.S. PATENT DOCUMENTS

| | | |
|---|---|---|
| 10,326,947 B2 | 6/2019 | Hayashi et al. |
| 10,419,692 B2 | 9/2019 | Shiokawa et al. |
| 2007/0235634 A1 | 10/2007 | Ottney et al. |

(Continued)

FOREIGN PATENT DOCUMENTS

| | | |
|---|---|---|
| CN | 105432076 A | 3/2016 |
| CN | 107534728 A | 1/2018 |

(Continued)

OTHER PUBLICATIONS

Extended European Search Report issued by the European Patent Office dated Jan. 7, 2020 in corresponding European Patent Application No. 19189709.9.

(Continued)

*Primary Examiner* — Phuoc Tran
(74) *Attorney, Agent, or Firm* — Carter, DeLuca & Farrell LLP

(57) ABSTRACT

To provide an image processing device which is user-friendly and is able to acquire an optimum image in which a user's intention is reflected based on various kinds of parameter setting by the user, the image processing device includes: a combination processing unit configured to combine a visible-light image signal and an infrared-light image signal to generate a combined image signal, and a parameter setting unit configured to set a parameter other than combination ratios of the visible-light image signal and the infrared-light image signal in the combined image signal. The combination processing unit changes the combination ratio in accordance with a change in the parameter when the parameter setting unit changes the parameter.

26 Claims, 13 Drawing Sheets

(56) References Cited

U.S. PATENT DOCUMENTS

| | | | |
|---|---|---|---|
| 2008/0099678 A1 | 5/2008 | Johnson et al. | |
| 2014/0192202 A1 | 7/2014 | Sano et al. | |
| 2016/0065926 A1* | 3/2016 | Nonaka | H04N 5/2351 348/164 |
| 2017/0061663 A1* | 3/2017 | Johnson | G06T 5/50 |
| 2020/0033701 A1 | 1/2020 | Numata | |
| 2020/0053297 A1* | 2/2020 | Tokizaki | G06T 5/50 |

FOREIGN PATENT DOCUMENTS

| | | |
|---|---|---|
| EP | 2938061 A1 | 10/2015 |
| JP | 2010161459 A | 7/2010 |
| JP | 2013247492 A | 12/2013 |
| WO | 2015058166 A2 | 4/2015 |

OTHER PUBLICATIONS

Notification of First Office Action issued by the China National Intellectual Property Administration dated Mar. 29, 2021 in corresponding CN Patent Application No. 201910890089.6, with English translation.

\* cited by examiner

IMAGE PROCESSING DEVICE, IMAGE PROCESSING METHOD, AND RECORDING MEDIUM

BACKGROUND OF THE INVENTION

Field of the Invention

The present invention relates to an image processing device, an image processing method, and a recording medium appropriate for a surveillance camera or the like.

Description of the Related Art

Imaging apparatuses for surveillance are required to acquire clear subject images even at low illumination circumstances such as night. As imaging apparatuses capable of acquiring clear subject images even at low illumination circumstances, imaging apparatuses that include image sensors having sensitivity in infrared light in addition to image sensors having sensitivity in visible light, and that combine and display image signals acquired from the two image sensors have been disclosed (for example, Japanese Unexamined Patent Publication No. 2013-247492).

In the technology disclosed in Japanese Unexamined Patent Publication No. 2013-247492, combination parameters in a combination process are automatically determined in accordance with photographing environments. However, images desired by the users may not necessarily be acquired in some cases.

An object of the present invention is to provide an image processing device that is able to acquire an optimum image in which an intention of a user is reflected based on a user's setting of various parameters and is convenient for use.

SUMMARY OF THE INVENTION

According to an aspect of the present invention, there is provided an image processing device including a combination processing unit configured to combine a visible-light image signal and an infrared-light image signal to generate a combined image signal and a parameter setting unit configured to set a parameter other than combination ratios of the visible-light image signal and the infrared-light image signal in the combined image signal. The combination processing unit changes the combination ratio in accordance with a change in the parameter when the parameter setting unit changes the parameter.

Further features of the present invention will become apparent from the following description of exemplary embodiments with reference to the attached drawings.

DESCRIPTION OF THE EMBODIMENTS

Figure 1:
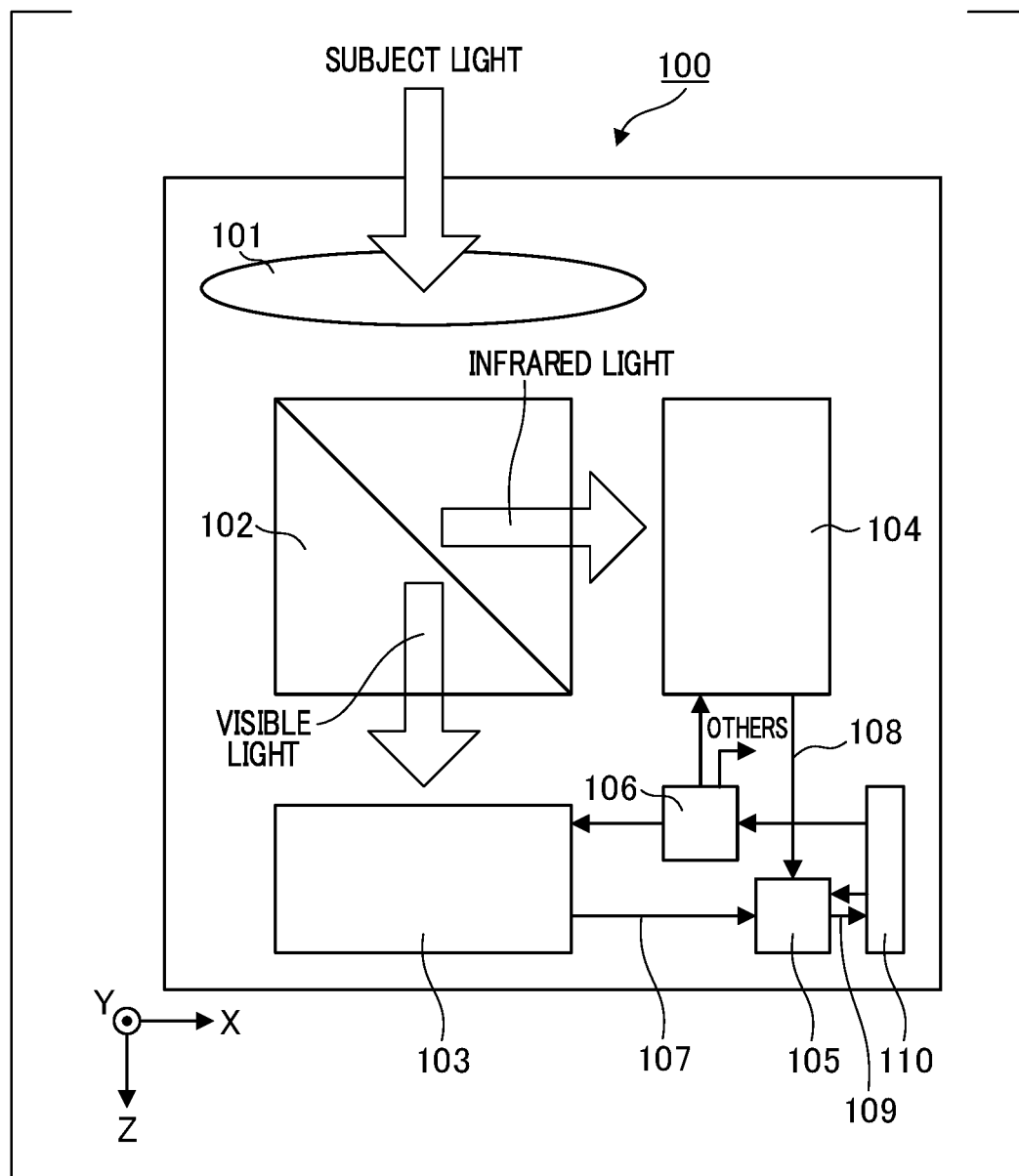
FIG. 1 is a diagram illustrating a configuration of an imaging apparatus according to a first embodiment.

Hereinafter, an imaging apparatus according to embodiments of the present invention will be described with reference to the drawings. Here, the same reference numerals are given to units that have the same functions throughout the drawings and repeated description thereof will be omitted.

First Embodiment

An imaging apparatus according to the embodiment is illustrated in FIG. 1. In FIG. 1, an imaging apparatus 100 includes an imaging optical system 101, an optical separation unit 102, a first image sensor 103, a second image sensor 104, a combination processing unit 105, a control unit 106, and a parameter setting unit 110. The parameter setting unit 110 is specifically a unit that sets various parameters (for example, a diaphragm, zoom, focus, brightness, contrast, color, and the like) at the time of photographing.

The optical separation unit 102 separates light incident via the imaging optical system 101 into light for the first image sensor 103 and light for the second image sensor 104. Specifically, the optical separation unit 102 is configured as a wavelength selection prism. Light (visible light) with a wavelength shorter than a wavelength of a specific threshold is transmitted through the wavelength selection prism and light (infrared light) with a wavelength longer than the wavelength of the specific threshold is reflected by the wavelength selection prism. The transmission/reflection herein means that 80% or more of the light is transmitted/reflected.

Figure 2:
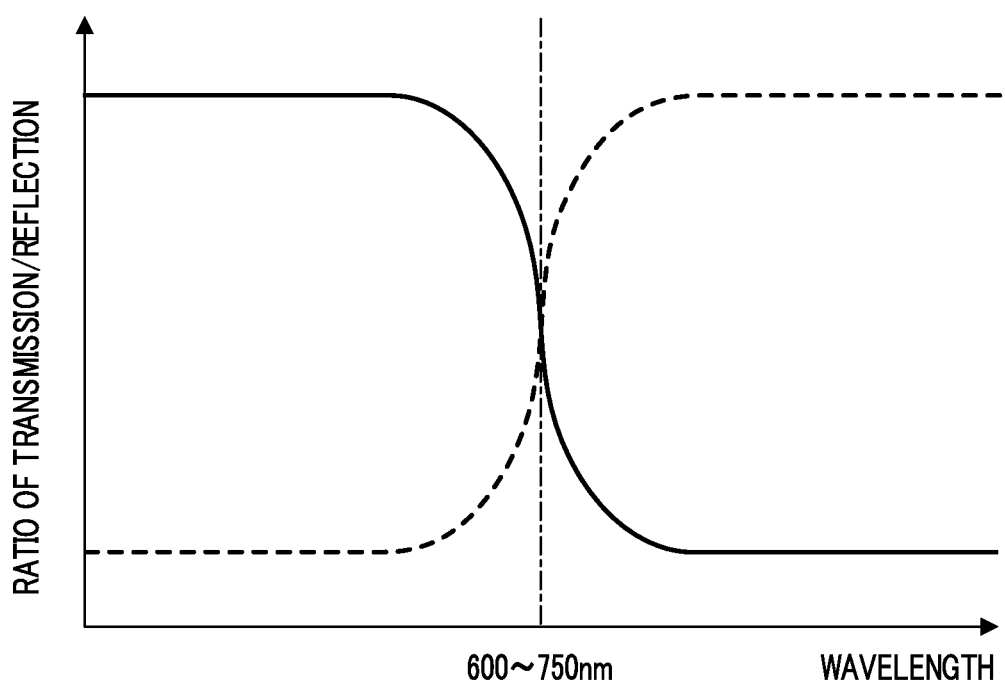
FIG. 2 is a diagram illustrating a spectral distribution of a wavelength selection prism.

That is, the visible light is incident on the first image sensor 103 and the infrared light is incident on the second image sensor 104. Here, the foregoing specific threshold is equal to or greater than 600 nm and equal to or less than 750 nm. That is, a boundary between the visible light and the infrared light is defined to be equal to or greater than 600 nm and equal to or less than 750 nm. The infrared light is light with a wavelength from the specific threshold to 2500 nm. An example of a spectral transmission spectrum and a spectral reflection spectrum of the wavelength selection prism is illustrated in FIG. 2. A solid line indicates transmission and a dotted line indicates reflection.

The first image sensor 103 has sensitivity for at least the visible light and the second image sensor 104 has sensitivity for at least the infrared light. For example, when Si is used as a material of a photoelectric conversion unit, it is possible to realize an image sensor that has sensitivity to light with a wavelength equal to or greater than 380 nm and a wavelength equal to or less than 1100 nm. Accordingly, in both the first image sensor 103 and the second image sensor 104, a photoelectric conversion unit may be formed of Si. For example, a solid-state image sensor of a CCD or CMOS type can be used as the first image sensor 103 and the second image sensor 104.

The pixels in the first image sensor 103 include on-chip color filters with an RGB Bayer array and a first image signal (visible-light image signal) 107 with an RGB format output from the first image sensor 103 includes color information in addition to luminance information. On the other hand, a second image signal (infrared-light image signal) 108 output from the second image sensor 104 includes only luminance information. The first image sensor 103 may have a sensitivity distribution in which the visible light is main light or may have a sensitivity distribution other than the visible light.

The second image sensor 104 may have a sensitivity distribution in which the infrared light is main light or may also have a sensitivity distribution of light other than the infrared light. The control unit 106 controls driving and reading of the image signals of the image sensors 103 and 104. The control unit 106 includes a computer such as a CPU or a memory. The memory stores a computer program causing the CPU to perform operations of flowcharts to be described below. The control unit 106 contains a driving circuit that controls operations of various circuits based on instructions from the CPU.

The combination processing unit 105 combines the first image signal 107 and the second image signal 108 to generate a third image signal (combined image signal) 109. Specifically, for example, the following process is performed.

First, the first image signal 107 read with the RGB format is subjected to demosaic processing and is developed to convert the signal into an image signal with a YUV format. At this time, YUV signals obtained from the first image signal 107 are referred to as Y1, U1, and V1. Similarly, the second image signal 108 is developed and converted into a signal with the YUV format. At this time, the Y signal of the second image signal 108 is referred to as Y2. In the second image signal 108, values of U and V are zero since the second signal does not include color signals.

Subsequently, the Y1 and Y2 signals are combined to generate a third image signal 109. Specifically, when YUV signals of the third image signal 109 are referred to as Y3, U3, and V3, the third image signal 109 is generated using the following expressions.

$$Y3 = \alpha \times Y1 + (1-\alpha) \times Y2 \quad \text{(Expression 1)}$$

$$U3 = U1 \quad \text{(Expression 2)}$$

$$V3 = V1 \quad \text{(Expression 3)}$$

Here, $\alpha$ is a real number equal to or greater than 0 and equal to or less than 1. As understood from Expression 1, with regard to the luminance information determined with the Y signal, as the value of $\alpha$ is larger, the third image signal 109 is closer to the first image signal 107. As the value of $\alpha$ is smaller, the third image signal 109 is closer to the second image signal 108. With regard to color information determined with a ratio among the U, V, and Y signals, as the value of $\alpha$ is larger, the third image signal 109 is closer to the first image signal 107. As the value of $\alpha$ is smaller, the third image signal 109 is closer to the second image signal 108.

At low illumination circumstances such as at night, an infrared-light component is stronger than a visible-light component in many cases. Accordingly, by causing the combination processing unit 105 to perform a combination process, it is possible to obtain the third image signal 109 that has a better SN ratio than the first image signal 107 and has both luminance information and color information.

The third image signal 109 is closer to the first image signal 107 as the value of $\alpha$ is larger, as understood from Expression 1. Therefore, the third image signal 109 becomes an image signal with excellent color reproducibility. On the other hand, the third image signal 109 is closer to the second image signal 108 as the value of $\alpha$ is smaller. Therefore, the third image signal 109 becomes an image signal with an excellent SN ratio. That is, the color reproducibility and the SN ratio have a trade-off relation. Thus, by controlling the value of $\alpha$, it is possible to change which is considered to be more important between the SN ratio and the color reproducibility.

Figure 3:
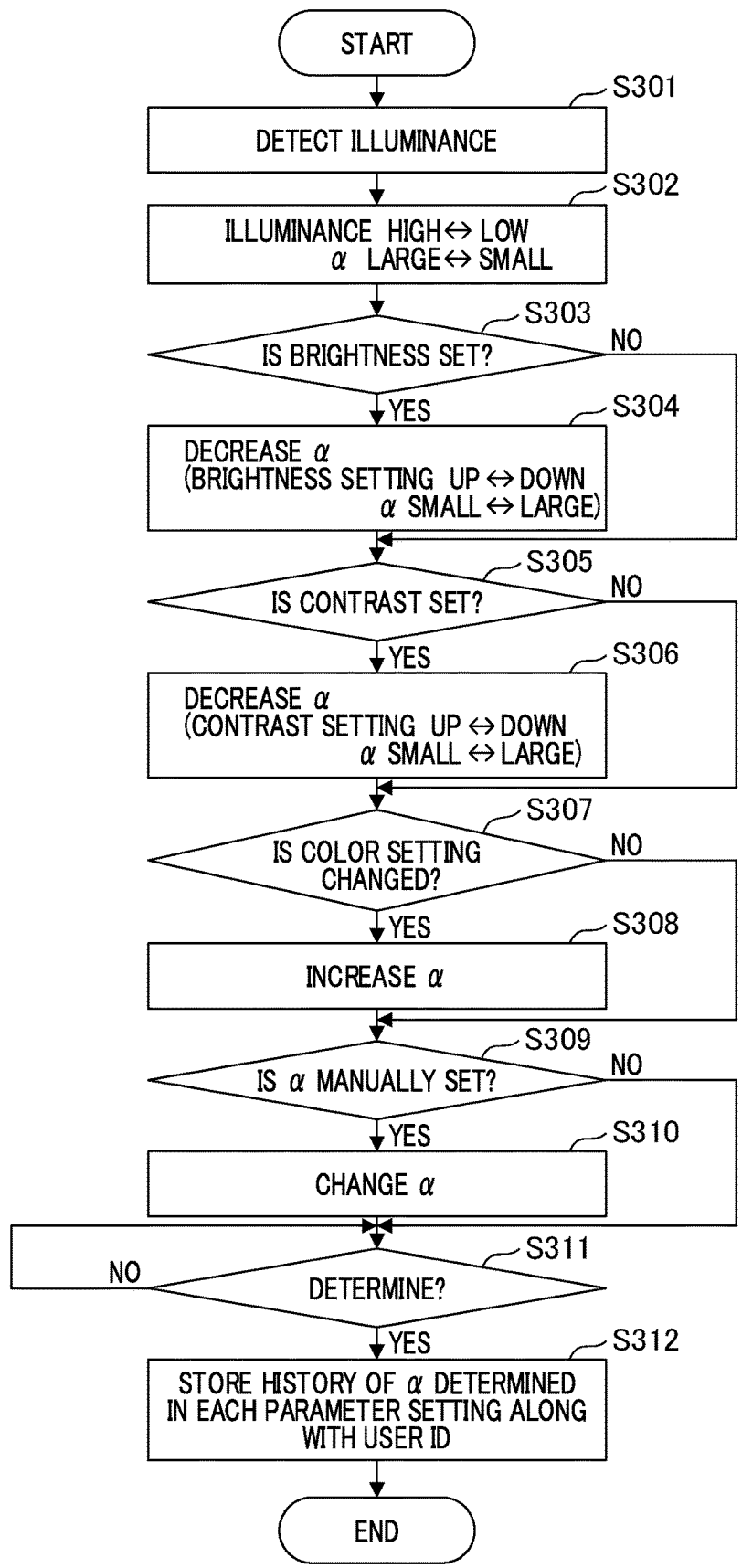
FIG. 3 is a flowchart illustrating an operation according to a first embodiment.

Next, FIG. 3 is a flowchart illustrating an operation according to the embodiment. First, in S301, illuminance of a photographing environment is measured. Specifically, for example, by averaging levels of the Y signals of the first image signal, it is possible to detect illuminance of a subject. Then, in S302, the value of $\alpha$ is determined in accordance with the detected illuminance. Specifically, as the illuminance is higher, $\alpha$ is set to be larger. As the illuminance is lower, $\alpha$ is set to be smaller.

That is, a combined image signal in which the color reproducibility is considered to be important as the illuminance is higher is generated and a combined image signal in which the SN ratio is considered to be important as the illuminance is lower is generated. For example, when sufficient illuminance is obtained, $\alpha$ is set to 1 and the first image signal 107 is displayed. As the illuminance decreases, $\alpha$ is made smaller, weight is continuously changed, and the third image signal 109 which is a combined image signal is displayed. Then, finally, $\alpha$ is set to 0 and the second image signal 108 is displayed.

However, even at the same illuminance, there are different cases in which the user considers the color reproducibility to be important and in which the user considers the SN ratio to be important. Accordingly, in the embodiment, since which of the color reproducibility and the SN ratio is considered to be important is switched by changing the foregoing $\alpha$ further in consideration of an intention of the user from various setting situations of a user interface related to the imaging apparatus, it is possible to acquire an optimum image signal. This will be described in more detail below.

Figure 4:
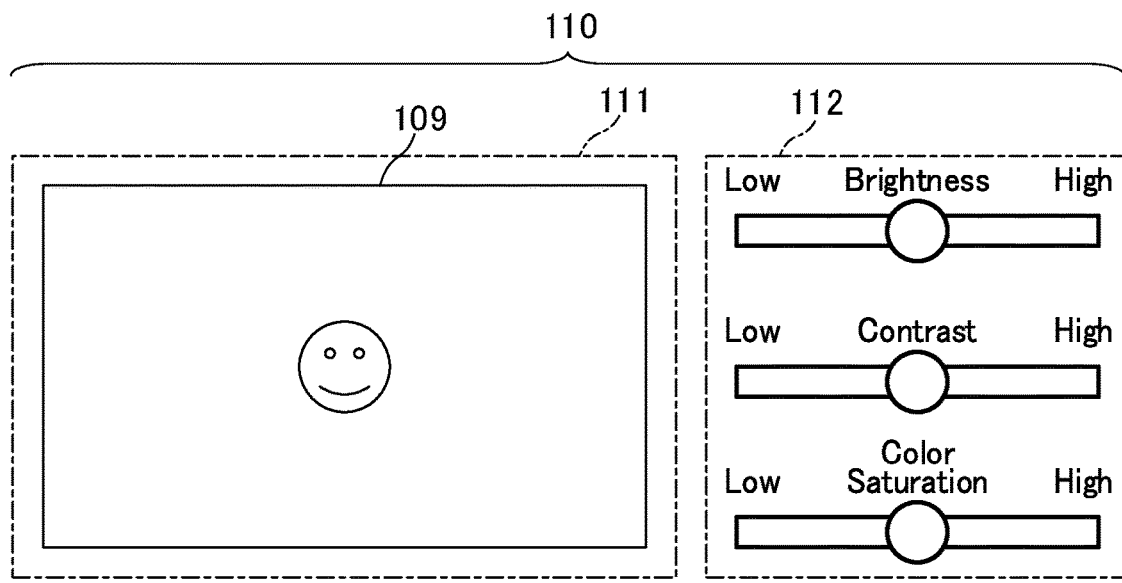
FIG. 4 is a diagram illustrating a configuration example of a parameter setting unit according to the first embodiment.

FIG. 4 is a diagram illustrating a configuration example of a parameter setting unit. The parameter setting unit 110 is configured as, for example, a liquid crystal touch panel that is able to display an image and includes a display unit 111 that displays the third image signal 109 generated by the combination processing unit 105. Further, the parameter setting unit 110 further includes an interface 112 that performs setting related to quality of a combined image signal such as exposure, contrast, and color of an image, particularly, parameters at the time of photographing.

That is, the interface 112 is provided to set parameters (particularly, parameters at the time of photographing) other than combination ratios of the visible-light image signal and the infrared-light image signal in the combined image signal. When the user performs setting related to exposure, contrast, color, and the like using the interface 112 such as a cursor or a touch panel, the setting is reflected and the third image signal 109 displayed on the display unit 111 is changed.

As will be described below, the display unit 111 or the interface 112 may not be included inside the imaging apparatus 100. For example, the imaging apparatus 100 may be configured to transmit the third image signal 103 to a client apparatus such as a PC or a smartphone via a network for a user to set photographing parameters using a display unit or an interface disposed on the client apparatus.

Further, the combination processing unit 105 may also be disposed on the client apparatus, the first and second image signals may be transmitted from the imaging apparatus 100 to the client apparatus in response to an instruction from the client apparatus, and the client apparatus may combine the first and second image signals.

In S303 of FIG. 3, it is first determined whether the user performs setting related to brightness. Here, the setting related to brightness includes setting for changing a target exposure level. The setting related to brightness is setting of a parameter related to quality of the combined image signal and setting of a parameter other than combination ratios of the visible-light image signal and the infrared-light image signal in the combined image signal. In the embodiment, the parameter related to the quality can be set as the photographing parameters at the time of photographing.

The setting also includes automatic exposure setting in a shutter priority mode or manual setting of a shutter speed or a gain (imaging sensitivity). The setting also includes manual setting of a shutter speed or a gain less than a predetermined value or setting of an upper limit/lower limit of the shutter speed or the gain. The setting also includes setting of brightness (also referred to as luminance) of an image to be displayed. When the imaging optical system 101 has a diaphragm adjustment function, the setting also includes automatic exposure setting of diaphragm priority or manual setting of a diaphragm value.

When the user performs the setting related to brightness, the foregoing $\alpha$ is decreased by a predetermined ratio since it is understood that the user considers brightness of the third image signal 109 or a sense of resolution of the third image signal 109 to be important.

That is, in S304, $\alpha$ is decreased by the predetermined ratio. Further, for example, when the user increases a target exposure level or increases brightness of an image, the user may further decrease $\alpha$ to improve visibility of a dark portion in the third image signal 109. On the other hand, when the user has lowered the target exposure level or lowered the brightness of an image, the user may increase $\alpha$ since the user wants to improve visibility of a bright portion in the third image signal 109.

When the mode is switched to the diaphragm priority mode or the user adjusts the diaphragm in S304, that is, the diaphragm is opened, a sense of resolution of a subject near a focus surface can be understood to be improved. When the diaphragm is narrowed, the sense of resolution of the subject distant from a focus surface can be understood to be improved. Accordingly, in either case, $\alpha$ is decreased by the predetermined ratio.

In general, a resolution of an imaging optical system is the highest near a focus surface. When an object is sufficiently distant, the resolution decreases in proportion to a reciprocal of a distance from the focus surface as the object is away from the focus surface. The resolution on the focus surface slightly shifts due to an influence of aberration or diffraction, but is approximately inversely proportional to an F value (diaphragm value) of an imaging optical system.

A constant of proportionality of the resolution for the reciprocal of the distance from the focus surface slightly shifts due to the influence of aberration or diffraction, but is approximately inversely proportional to a square of an F value of an imaging optical system. That is, as the diaphragm is opened, a sense of resolution of an image near a focus surface increases. As the diaphragm is narrowed, the sense of resolution of a subject distant from a focus surface is higher. Accordingly, when the user operates the diaphragm to increase the sense of resolution, $\alpha$ is decreased by the predetermined ratio.

When the user shortens the shutter speed in S304, the sense of resolution of a subject in which a motion amount is large can be understood to be improved. When the user lengthens the shutter speed, visibility of a dark portion can be understood to be improved. This is because an influence of a motion blur is smaller as the shutter speed is shorter, and an amount of light incident on pixels of an image sensor increases and an SN ratio of the dark portion is therefore improved as the shutter speed is longer. Accordingly, when the mode is switched to the shutter speed priority mode or the shutter speed is adjusted, $\alpha$ is decreased by the predetermined ratio.

Similarly, when the user sets a gain or an upper limit of the gain in S304, visibility of the dark portion can be understood to be improved. Accordingly, $\alpha$ is decreased by the predetermined ratio.

As described above, when the user performs the setting related to brightness in S303, it can be understood that the user has an intention to desire to consider which is important between the brightness of the third image signal 109 and the sense of resolution of the third image signal 109, as the background. That is, in either case, it can be understood that the user considers the luminance information to be more important than the color information.

Accordingly, in the imaging apparatus 100 according to the embodiment, $\alpha$ is basically decreased by the predetermined ratio (for example, a few %) in S304 when the user performs any one setting related to brightness such as the foregoing setting related to brightness. When the user performs setting to further increase brightness (for example, the user sets the diaphragm value to be less than a predetermined value, sets the shutter speed to be longer than a predetermined value, or increases the imaging sensitivity to be higher than a predetermined value), the combination ratio $\alpha$ is further decreased so that the third image signal 109 is closer to the second image signal 108.

As described above, as the combination ratio $\alpha$ is smaller, the SN ratio of the image can be further improved. Therefore, an image intended by the user can be acquired. Conversely, when the user sets setting to lower the brightness, $\alpha$ may be increased.

Subsequently, in S305, it is determined whether the user performs setting related to contrast.

Here, the setting related to contrast includes setting of contrast of an image to be displayed, intensity of edge enhancement, and image compression. The setting related to contrast is setting of parameters related to quality of a combined image signal and setting of parameters other than combination ratios of the visible-light image signal and the infrared-light image signal in the combined image signal. When the imaging optical system has a manual focus adjustment function or a manual zoom adjustment function, the setting related to contrast includes manual setting related to focus or zoom.

When the user performs the setting related to contrast, it can be understood that the user considers the sense of resolution of the third image signal 109 to be important.

That is, when the user adjusts focus, the user has an intension to desire to improve the sense of resolution of the entire third image signal 109 or its partial region because the sense of resolution of a region which the user desires to view is not sufficient. When the user sets a zoom magnification to be high or the user increase the contrast of an image to be displayed, the user has an intention to desire to improve the sense of resolution because the sense of resolution of a region which the user desires to view is not sufficient.

As described above, when the user performs the setting related to contrast, it can be understood that the user has an intention to desire to consider the sense of resolution of the third image signal 109 to be important, as the background. That is, it can be understood that the user considers the luminance information to be more important than the color information.

Accordingly, in the imaging apparatus 100 according to the embodiment, when the user performs the setting of contrast in S305, α is decreased by the predetermined ratio (for example, a few %) in S306. Further, when the user performs setting to increase the contrast, a is further decreased so that the third image signal 109 is closer to the second image signal 108. As described above, as the combination ratio α is smaller, the SN ratio of the image signal can be further improved. Therefore, an image intended by the user can be acquired. Conversely, when the user sets setting to lower the contrast, α may be increased. In the embodiment, α is decreased by the predetermined ratio in each of S304 and S306. However, for example, when a is decreased by the predetermined ratio in S304, α may not be decreased again in S306.

Subsequently, in S307, it is determined whether the user performs setting related to color. Here, the setting related to color includes setting such as manual adjustment of a gain or each color or a change in color saturation of an image to be displayed. The setting related to color includes setting of color temperature setting such as adjustment of automatic color balance by the user.

When the user performs the setting related to color, the user considers the color reproducibility of the third image signal 109 to be important. This is because when the user performs the setting related to color, it is possible to read an intention to desire to improve the color information because the user feels that visibility of the color information of the currently displayed third image signal 109 is insufficient.

Accordingly, in the imaging apparatus 100 according to the embodiment, when the user performs the setting related to color, the combination ratio α is increased in S308 by the predetermined ratio (for example, a few %) and the third image signal 109 is closer to the first image signal 107. As described above, as the combination ratio α is larger, the color reproducibility of an image is further improved.

Therefore, it is possible to obtain the image intended by the user.

In the embodiment, after α is decreased by the predetermined fixed ratio once in S304 or S306, a is increased by the predetermined fixed ratio in S308. However, α used in S304, S306, and S308 may be a variable ratio determined in accordance with the illuminance as determined in S302.

The case in which only the third image signal 109 is displayed has been described above, but one or both of the first image signal 107 and the second image signal 108 may be displayed simultaneously along with the third image signal 109. Here, particularly when the imaging apparatus 100 transmits an image signal to a client apparatus via a network, a data amount increases as the kinds of displayed images are larger, thereby causing delay of the displayed images. Therefore, it is preferable to transmit and display only the third image signal 109.

A constant value (for example, 0.5) may be used as the combination ratio α before the user performs the setting related to brightness, contrast, and color. Alternatively, when the user performs the setting related to brightness, contrast, and color, how much the combination ratio α is changed may be determined in accordance with the extent of the change in the parameters. For example, it is preferable to increase the extent of the change in the combination ratio as the extent of the change in a value of an exposure level, image brightness, contrast, color saturation, or the like is larger.

The user may set the combination ratio α directly, but it is preferable to read an intention of the user indirectly from the setting of the photographing parameters and change α, as in the embodiment. The reason will be described below. Since an imaging apparatus acquiring a normal visible-light image signal does not combine a visible-light image signal and an infrared-light image signal, the user may not change the combination ratio α. Therefore, it is difficult for a user who is familiar with an imaging apparatus acquiring a normal visible-light image signal to predict how a combined image signal to be generated is changed when the combination ratio α is changed.

Since the user performs only the setting of the photographing parameters also used in an imaging apparatus acquiring a normal visible-light image signal in the imaging apparatus according to the embodiment, it is easy for the user to predict a change in an image to be generated. That is, the imaging apparatus according to the embodiment can automatically determine the optimum combination ratio α and generate the third image signal intended by the user when the user merely sets photographing parameters similar to those of an imaging apparatus acquiring a normal visible-light image signal. Accordingly, user-friendly setting is automatically performed even when there is no special technical knowledge.

After S308, the user may check a display state of the third image signal and may be able to set (minutely adjust) α further manually. That is, the user interface includes a setting unit that sets α manually. In S309, it is determined whether the manual setting of α is performed within a predetermined time. When the determination is Yes, α is changed in S310 in accordance with the determination. Thereafter, the process proceeds to S311. In the case of No in S309, α is not changed and the process proceeds to S311.

In S311, (the user determines that the various kinds of setting are completed for the displayed combined image signal) and a decision button (not illustrated) is pressed or it is determined whether a predetermined time or more has passed from the final setting. When the determination is Yes in S311, that is, the decision button is pressed or the predetermined time has passed from the final setting, the process proceeds to S312. Then, the various parameter setting states, the final α, and a user ID are associated and stored as learning data in a non-volatile memory (not illustrated), and then the flow ends.

The learning data stored in the non-volatile memory may be read when the flow of FIG. 3 starts and a user ID is input. By doing so, optimum setting in which a preference of each user is reflected can be set by referring to previous setting information of each user read from the non-volatile memory when α or the like is changed in the flow of FIG. 3.

Second Embodiment

In an imaging apparatus according to a second embodiment, a case in which the combination ratio α is changed in accordance with setting of photographing parameters by a user and a case in which the combination ratio α is not changed are properly used. Specifically, when an intention of the user can be reflected without changing the combination ratio α, α is not changed. When an intention of the user may not be reflected without changing α, α is changed. This configuration is preferable since the third image signal 109 in which an intention of the user is reflected further accurately can be acquired.

For example, a case in which the user changes color saturation will be described with reference to FIGS. 5 to 7. The color saturation is larger as the U or V signal are larger. As described above, as the combination ratio α is larger, a ratio of the U signal to the Y signal or a ratio of the V signal to the Y signal can be improved. On the other hand, in order to improve the ratio of the U signal or the V signal to the Y signal, the color saturation may be increased or the combination ratio α may be increased.

In general, when the color saturation is the same, that is, the Y signal is changed without changing the values of the U and V signals, color vividness looks different. That is, since the ratio of the U or V signal to the Y signal is equivalent to color vividness, the ratio of the U or V signal to the Y signal is referred to as color vividness.

That is, when the user desires to decrease the color vividness, a method of decreasing saturation in accordance with a color gain or a method of decreasing the combination ratio α and generating the third image signal 109 close to the second image signal 108 can be selected when the third image signal 109 is generated and displayed. Conversely, when the user desires to increase the color vividness, a method of improving saturation in accordance with a color gain or a method of increasing the combination ratio α and generating the third image signal 109 close to the first image signal 107 can be selected when the third image signal 109 is generated and displayed. Accordingly, the imaging apparatus according to the second embodiment performs the following control.

Figure 5:
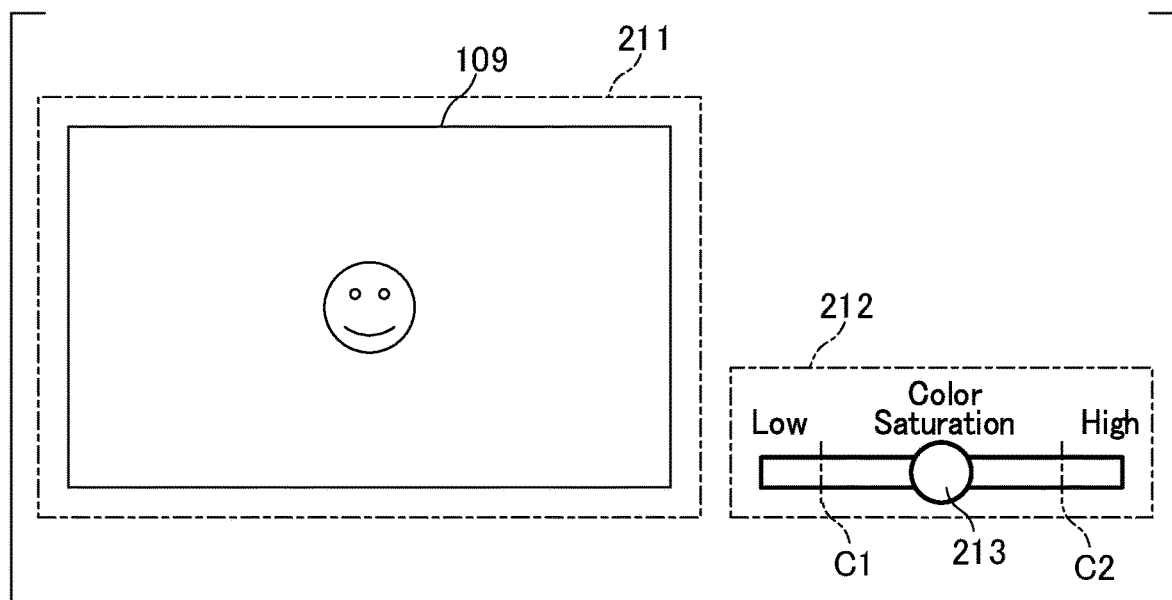
FIG. 5 is a diagram illustrating a configuration example of a parameter setting unit according to a second embodiment.
Figure 6:
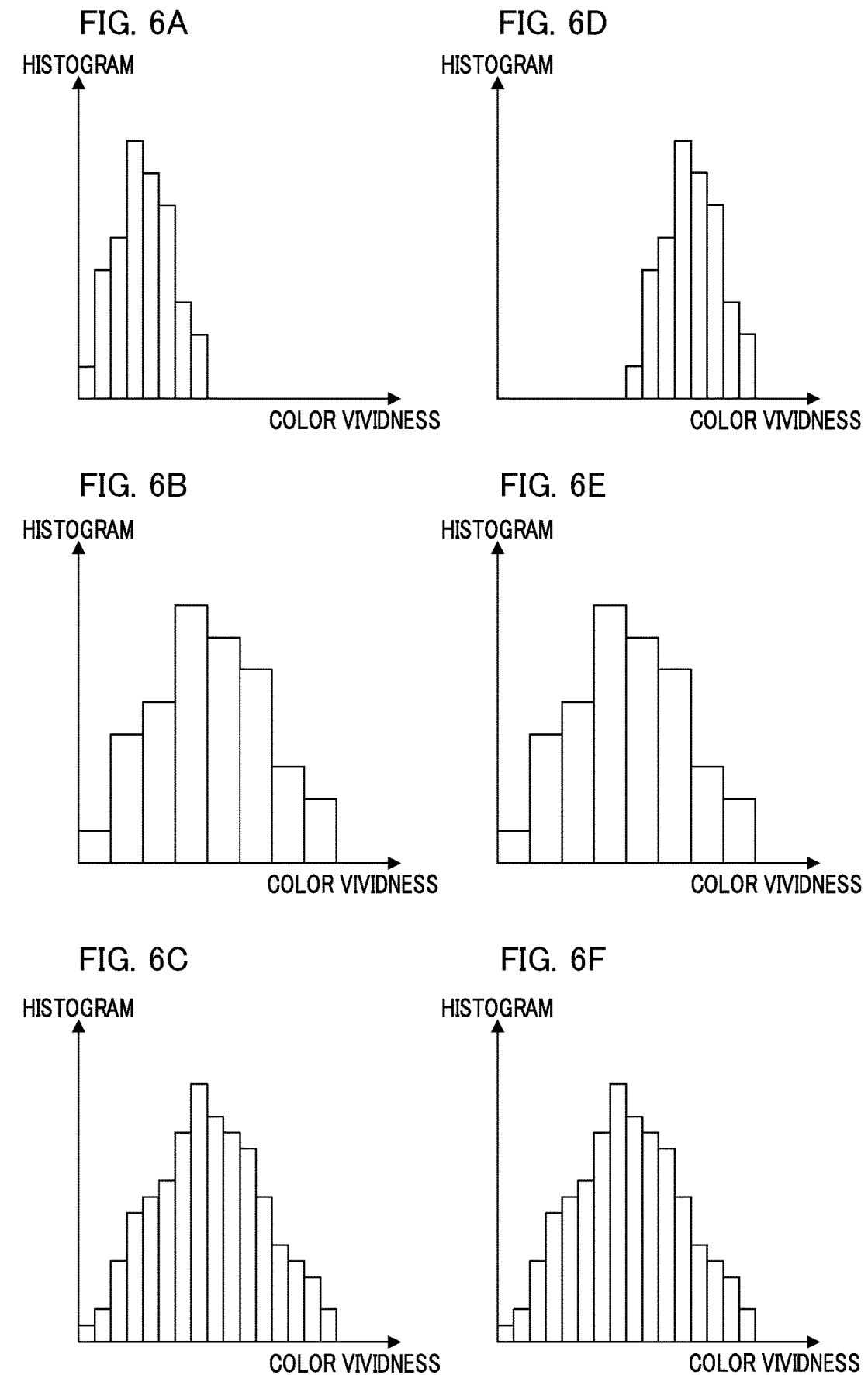
FIGS. 6A to 6F are explanatory diagrams illustrating histograms when a color gain or α is changed.

FIG. 5 is a diagram illustrating an example of the parameter setting unit 110 of the imaging apparatus according to the second embodiment. The parameter setting unit 110 includes a display unit 211 that displays the third image signal 109 generated by the combination processing unit 105 and a user interface 212 that is used to perform the setting related to quality of a combined image signal, such as exposure, contrast, or color of an image.

That is, the user interface 212 is provided to set parameters other than the combination ratios of the visible-light image signal and the infrared-light image signal in the combined image signal. In FIG. 5, only the user interface used to set color saturation is illustrated as an example. However, an interface may be provided for brightness or contrast as in FIG. 3. A color saturation setting cursor 213 is a user interface in which the color saturation is lower in a leftward operation and the color saturation is higher in a rightward operation.

When the position of the saturation setting cursor is greater than the first saturation threshold C1 and is less than the second saturation threshold C2 (where C1<C2), the third image signal 109 of saturation intended by the user can be acquired with only a change in the color gain at the time of display. Conversely, when the position of the saturation setting cursor is less than the first saturation threshold C1 and is greater than the second saturation threshold C2, it is difficult to acquire the third image signal 109 of the saturation intended by the user with only a change in the color gain at the time of display.

FIGS. 6A to 6F are diagrams for describing histograms when the color gain or α is changed. More specifically, FIGS. 6A to 6F are schematic diagrams for describing a difference between a case in which the color vividness is changed by changing the color gain at the time of display and a case in which the color vividness is changed in accordance with the combination ratio α.

FIG. 6A illustrates a case before the color vividness is changed, FIG. 6B illustrates a case in which the color gain at the time of display is increased with respect to FIG. 6A, and FIG. 6C illustrates a case in which the combination ratio α is increased with respect to FIG. 6A. FIG. 6D illustrates a case before the color vividness is changed, FIG. 6E illustrates a case in which the color gain at the time of display is decreased with respect to FIG. 6D, and FIG. 6F illustrates a case in which the combination ratio α is decreased with respect to FIG. 6D.

When the color vividness is changed by changing the color gain, grayscales equal to or greater than the number of bits of an original image may not be expressed. Therefore, color reproducibility of intermediate grayscales may deteriorate as in FIGS. 6B and 6E. In particular, as the color gain is considerably changed, information regarding color with the intermediate grayscales is lost. Conversely, when the color vividness is changed in accordance with the combination ratio α, intermediate grayscales at a location at which the third image signal 109 is generated can be maintained. Therefore, the color vividness can be changed with the intermediate grayscales remaining as in FIGS. 6C and 6F.

Figure 7:
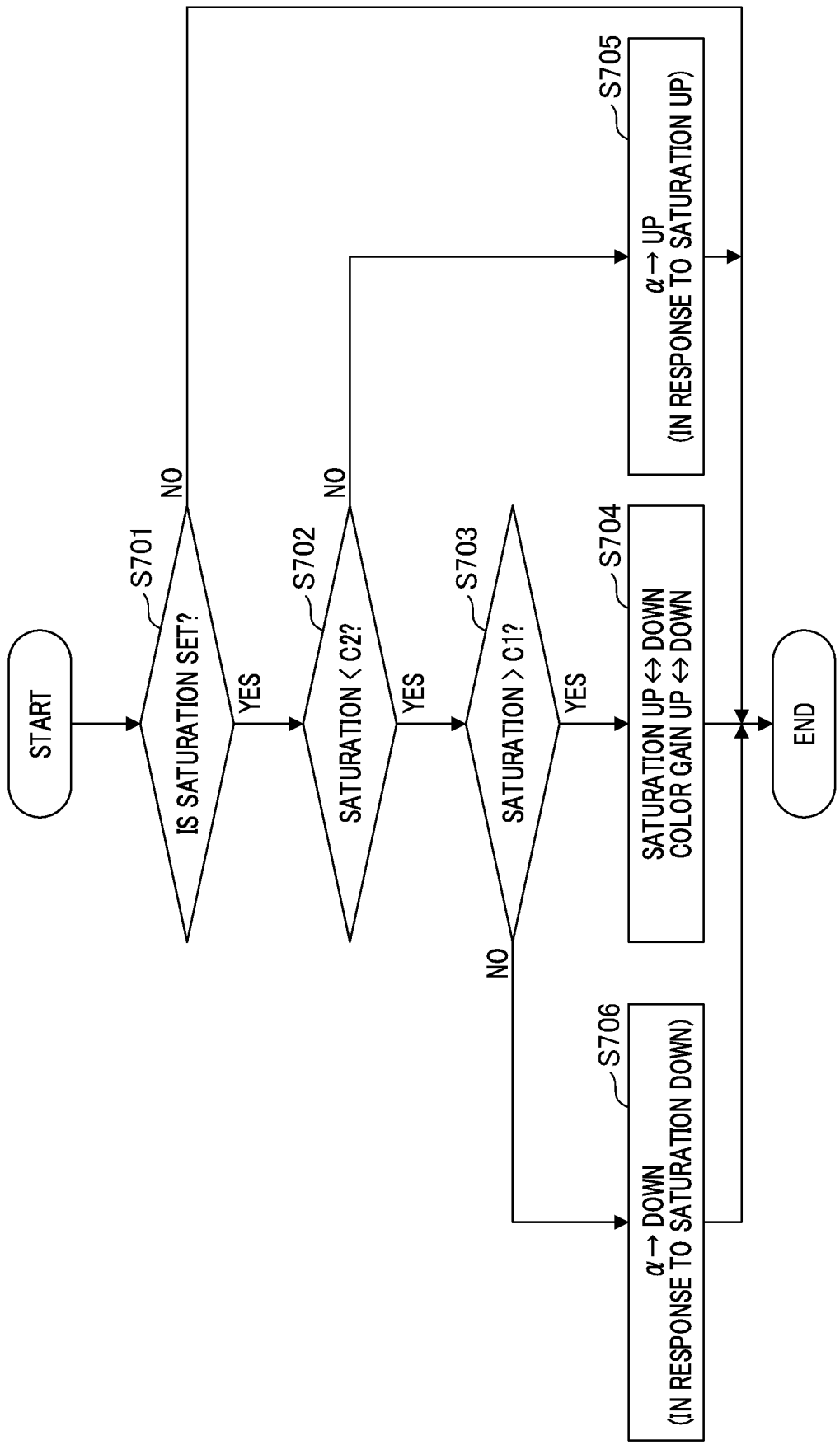
FIG. 7 is a flowchart illustrating a saturation setting operation according to a second embodiment.

FIG. 7 is a flowchart illustrating a saturation setting operation according to the second embodiment. In the second embodiment, it is determined in S701 whether the saturation is set. When the saturation is set, it is determined in S702 whether the changed saturation is less than the second saturation threshold C2. When the determination is Yes in S702, it is determined whether the saturation changed in S703 is greater than the first saturation threshold C1. When the saturation changed in S703 is greater than the first saturation threshold C1, the color gain is increased or decreased in accordance with the increase or decrease of the setting of the saturation without changing the combination ratio α (S704: the center route of FIG. 7).

Conversely, when the determination is No in S702, that is, the changed saturation is not less than the second saturation threshold C2, the combination ratio α is increased in accordance with the increase in the saturation and the third image signal 109 is close to the first image signal 107 (S705: the rightmost route of FIG. 7). Conversely, when the changed saturation is not greater than the first saturation threshold C1 in S703, the combination ratio α is decreased in accordance with the decrease in the saturation and the third image signal 109 is closer to the second image signal 108 (S706: the leftmost route of FIG. 7). With such a configuration, it is possible to reflect an intention of the user more accurately. The reason will be described below.

When an imaging apparatus acquiring a normal visible-light image signal without performing a combination process is assumed, color vividness may not be controlled in accordance with the combination ratio. Accordingly, when the user changes color saturation in an imaging apparatus acquiring a normal visible-light image signal, the color vividness is changed in accordance with the color gain. Accordingly, even when the user changes the saturation in the imaging apparatus according to the embodiment, there is a high possibility of the user predicting the change in the color vividness in accordance with the color gain.

Accordingly, in the imaging apparatus according to the second embodiment, α is not changed in S704 and the color saturation is changed in accordance with the color gain within a range in which the reproducibility of the color of the intermediate grayscales is allowable, as in an imaging apparatus acquiring a normal visible-light image signal. With this configuration, it is possible to acquire an image with a less discomfort for the user predicting the same operation as that of an imaging apparatus acquiring a normal visible-light image signal. In the embodiment in FIG. 7, the color gain may be increased or decreased in accordance with the increase or decrease in the saturation even in S705 and S706.

Figure 8:
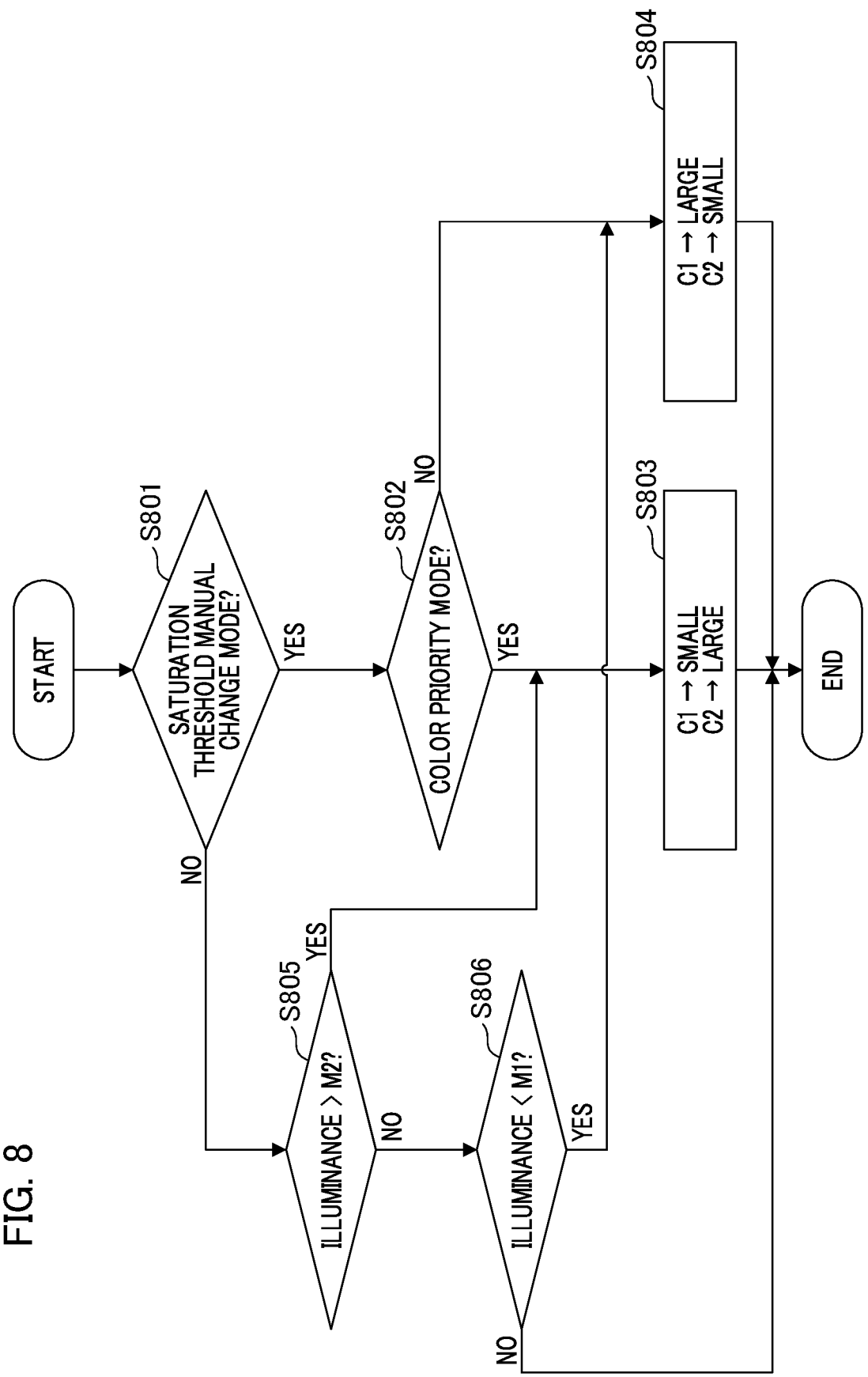
FIG. 8 is a flowchart illustrating variable setting of a saturation threshold according to the second embodiment.

The first saturation threshold C1 and the second saturation threshold C2 may be variable. FIG. 8 is a flowchart illustrating variable setting of the first saturation threshold C1 and the second saturation threshold C2 according to the second embodiment. In the embodiment, a mode in which a saturation threshold is manually changed through menu selection or a mode in which the saturation threshold is automatically changed can be selected. In the case of the mode in which the saturation threshold is manually changed, it is assumed that whether the mode is a color priority mode can be further selected. In FIG. 8, it is determined in S801 whether the saturation threshold is manually changed. When the determination is Yes, it is further determined in S802 whether the mode is the color priority mode.

In the case of the color priority mode, in S803, the combination ratio α is increased, the saturation threshold C1 is decreased, and the saturation threshold C2 is increased to broaden a gap between C1 and C2. When it is determined in S802 that the mode is not the color priority mode, the combination ratio α is decreased, the saturation threshold C1 is increased in S804, and the saturation threshold C2 is decreased to narrow the gap between C1 and C2.

Conversely, when it is determined in S801 that the mode is the mode in which the saturation threshold is automatically changed, it is determined in S805 whether illuminance is greater than a predetermined value M2. When it is determined in S805 that the illuminance is greater than M2, the process proceeds to S803. Then, the combination ratio α is increased, the saturation threshold C1 is decreased, and the saturation threshold C2 is increased to broaden the gap between C1 and C2.

When it is determined in S805 that the illuminance is not greater than M2, the process proceeds to S806. Then, it is determined whether the illuminance is less than a predetermined value M1 (where M1<M2). When the illuminance is less than M1 in S806, the process proceeds to S804. Then, the combination ratio α is decreased, the saturation threshold C1 is increased, and the saturation threshold C2 is decreased to narrow the gap between the C1 and C2. When the determination is No in S806, that is, the illuminance is between M1 and M2, C1 and C2 are not changed. By setting the first saturation threshold C1 and the second saturation threshold C2 to be variable in this way, it is possible to control a more optimally in the flowchart of FIG. 7.

Figure 9A:
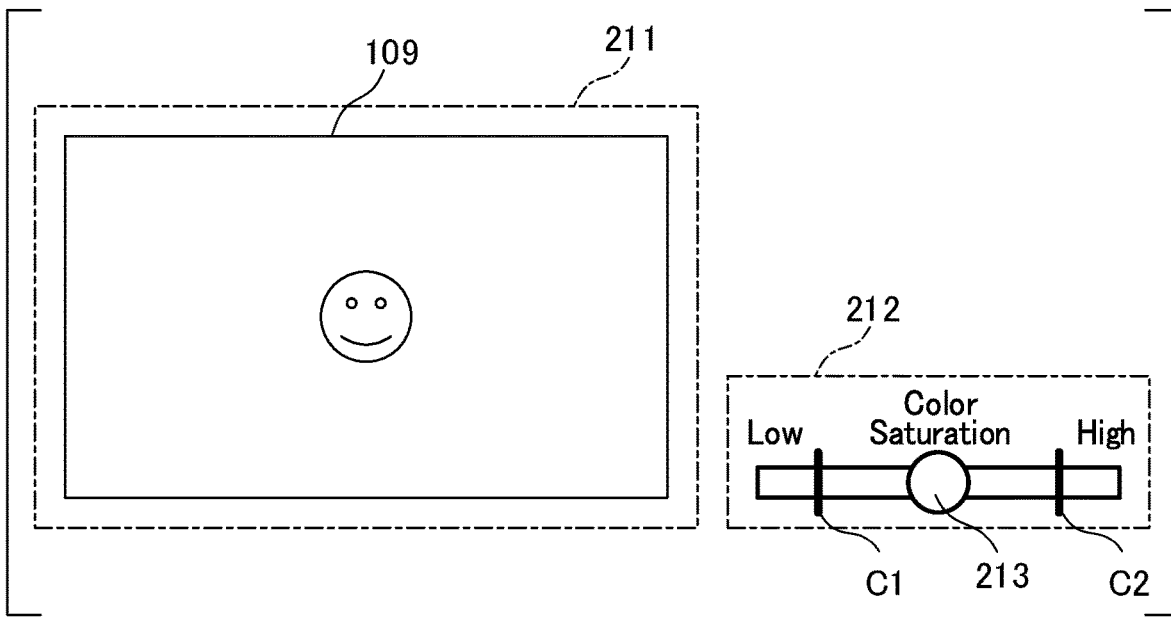
FIGS. 9A to 9E are diagrams illustrating modification examples of a user interface according to the second embodiment.
Figure 9B:
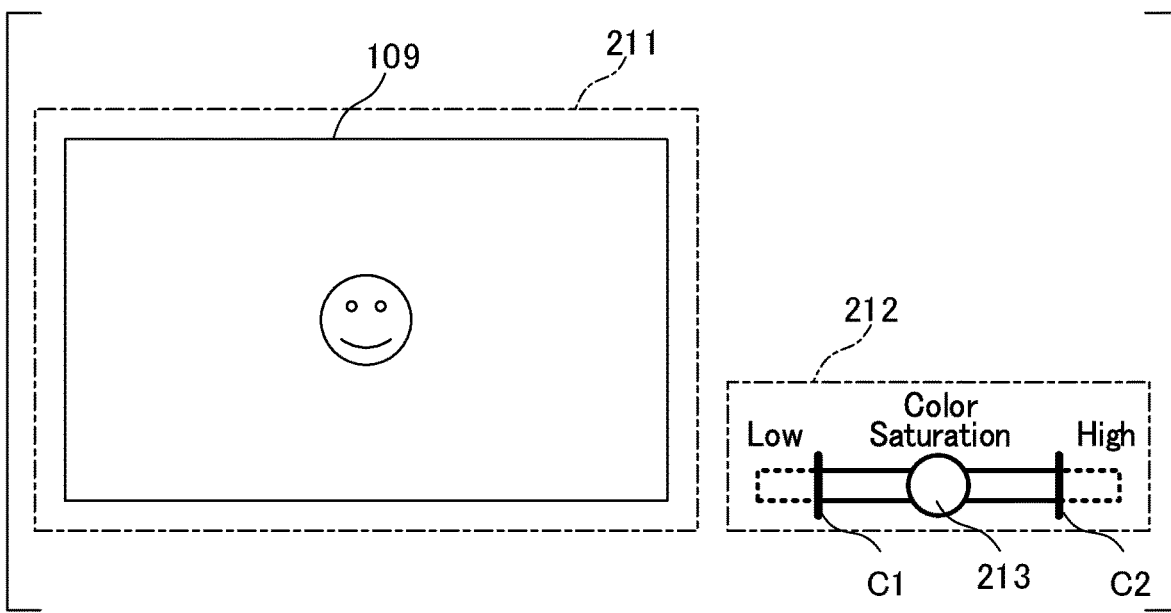

Next, FIGS. 9A to 9E are diagrams illustrating modification examples of the user interface 212 in FIG. 5 in the second embodiment. As illustrated in FIG. 9A, the first saturation threshold C1 and the second saturation threshold C2 may be displayed on the user interface 212. At this time, as illustrated in FIG. 9B, for example, color or brightness of the user interface, the thicknesses of lines, dotted lines, solid lines, or the like may be further preferably changed in a region between C1 and C2 and a region less than C1 or greater than C2. In FIG. 9B, the region between the first saturation threshold C1 and the second saturation threshold C2 is displayed with a solid line and a region less than the first saturation threshold C1 or greater than the second saturation threshold C2 is displayed with a dotted line.

Figure 9C:
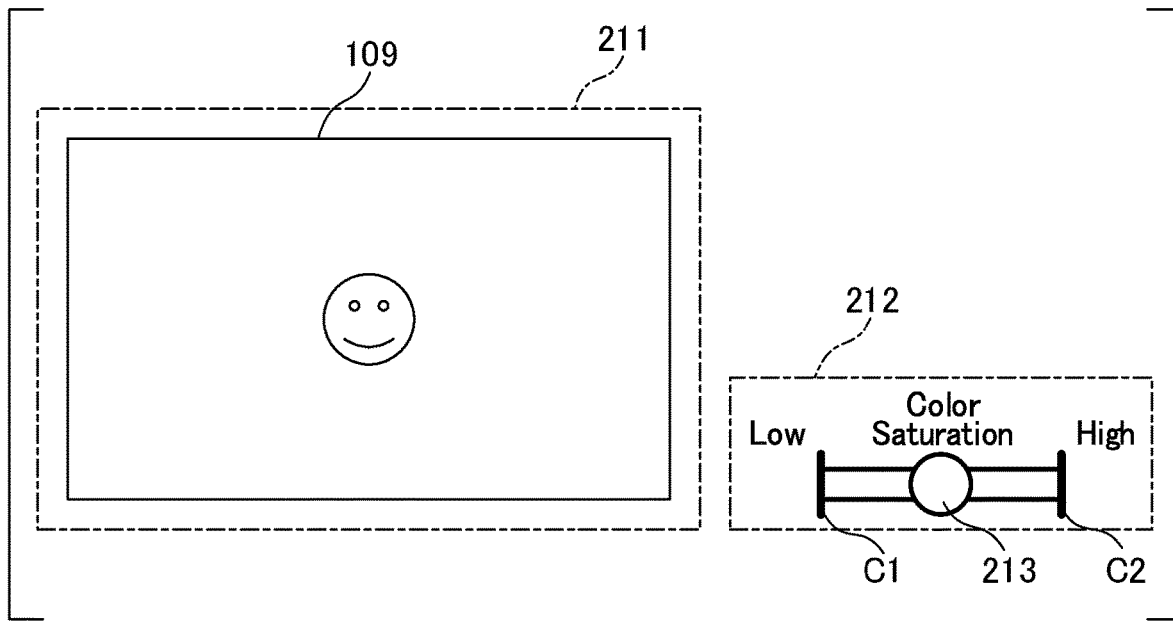
Figure 9D:
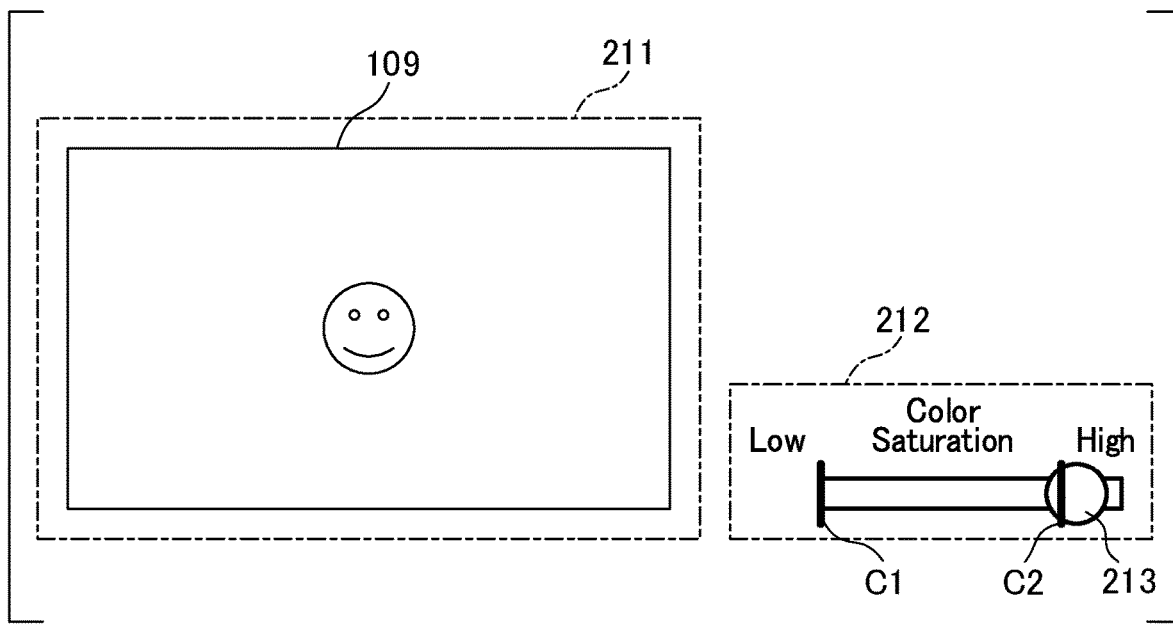

As illustrated in FIG. 9C, when the color saturation setting cursor 213 is in the region between C1 and C2, a portion of the region less than C1 or greater than C2 may not be displayed. At this time, as illustrated in FIG. 9D, only when the user sets the color saturation setting cursor 213 to be beyond the region of C2 from C1, the region less than C1 or greater than C2 may be displayed.

Figure 9E:
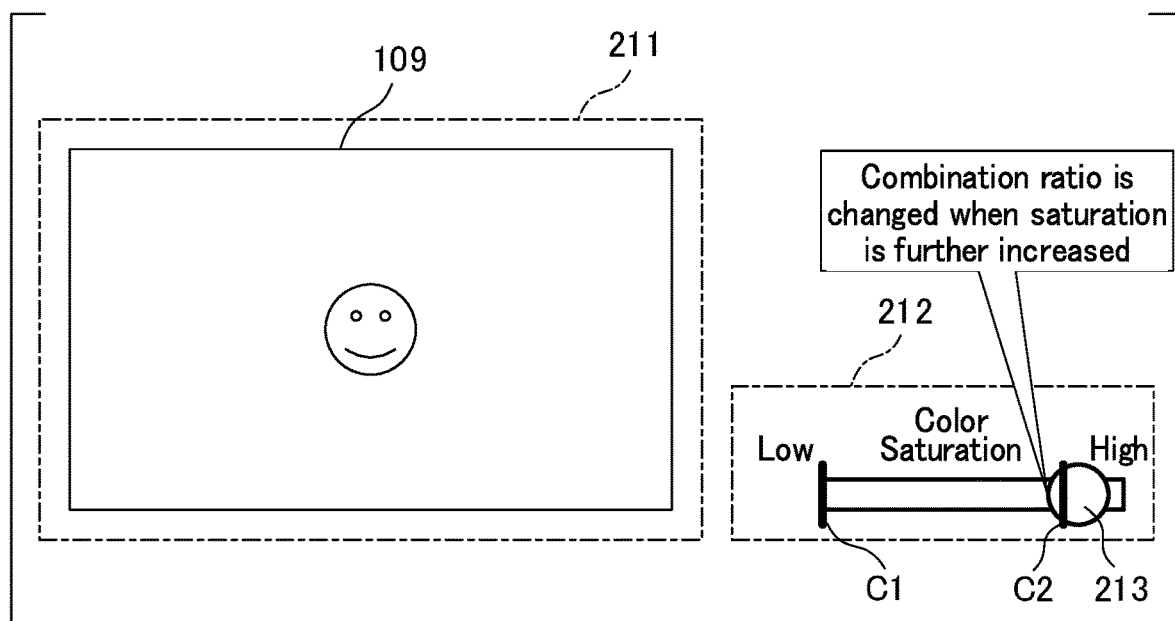

Alternatively, as illustrated in FIG. 9E, when the user sets the color saturation setting cursor 213 to be beyond the first saturation threshold C1 or the second saturation threshold C2, a pop-up warning (for example, "Combination ratio is changed when saturation is further increased" or the like) may be displayed.

The configuration illustrated in FIGS. 9A to 9E is preferable since the user can grasp whether the color saturation is changed with the change in the color gain or the combination ratio. FIGS. 9A to 9E illustrate a case in which the saturation setting cursor 213 is a combination of a rectangular bar and a circular cursor, but the saturation setting cursor 213 may have another figure or the saturation may be expressed with a number.

The case in which the user changes the color saturation has been described. However, the setting related to brightness may be configured similarly.

Third Embodiment

In a third embodiment, a similar configuration to that of the second embodiment is applied to brightness when a user changes the setting of brightness of a displayed image. As described above, at a low illumination time such as night, an infrared-light component is stronger than a visible-light component in many cases. Accordingly, the first image signal 107 is relatively darker than the second image signal 108.

That is, when the user desires to darken brightness, a method of generating the third image signal 109 and subsequently changing a luminance gain at the time of display to darken brightness or a method of increasing the combination ratio α can be selected. Conversely, when the user desires to light brightness, a method of generating the third image signal 109 and subsequently changing a luminance gain at the time of display to light brightness or a method of decreasing the combination ratio α can be selected.

Figure 10A:
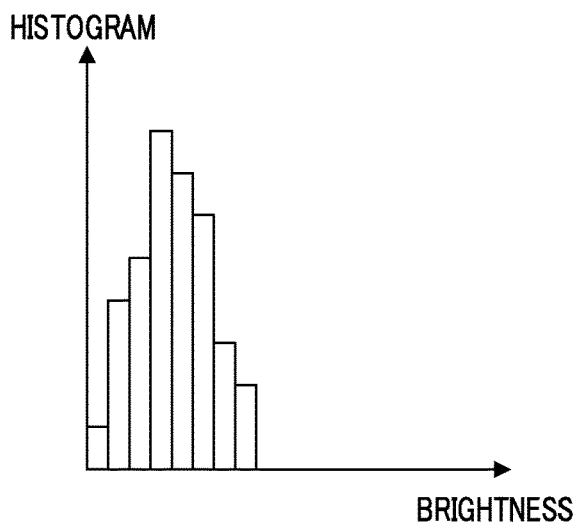
FIGS. 10A to 10F are explanatory diagrams illustrating histograms when a luminance gain or α is changed.
Figure 10D:
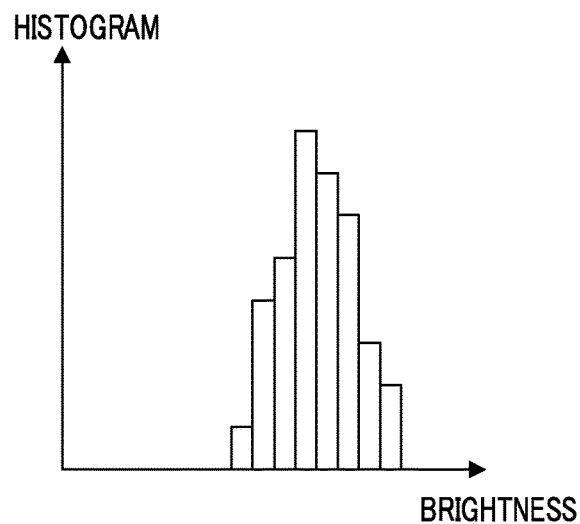
Figure 10B:
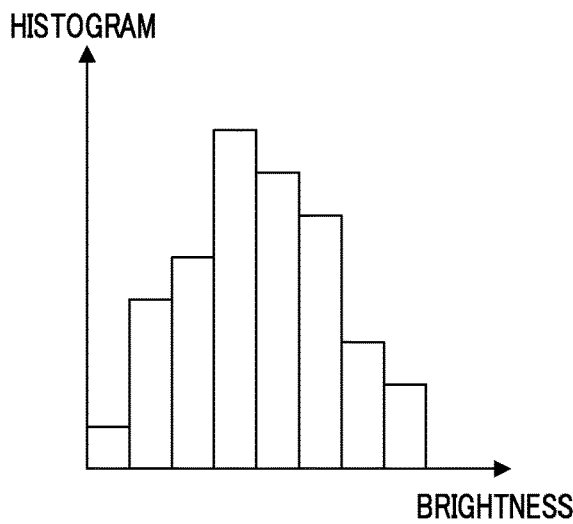
Figure 10E:
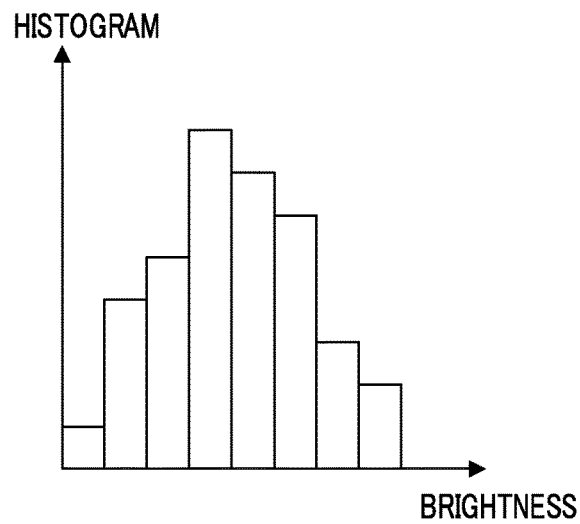
Figure 10C:
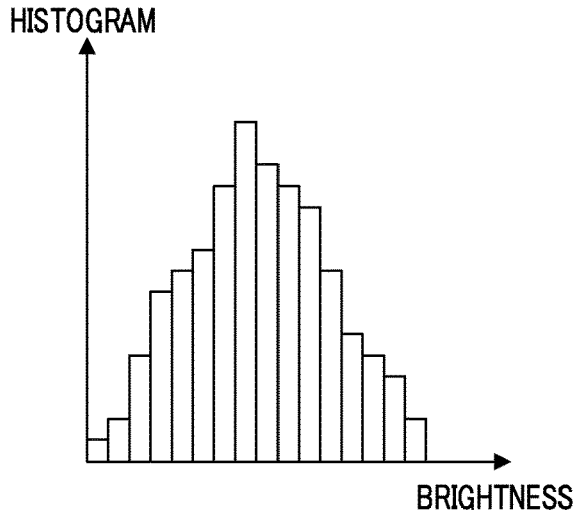

FIGS. 10A to 10F are schematic diagrams for describing a difference between a case in which brightness is changed by changing the luminance gain at the time of display and a case in which the brightness is changed in accordance with the combination ratio α by using histograms. FIG. 10A illustrates a case before the brightness is changed, FIG. 10B illustrates a case in which the luminance gain at the time of display is increased with respect to FIG. 10A, and FIG. 10C illustrates a case in which the combination ratio α is increased with respect to FIG. 10A.

Figure 10F:
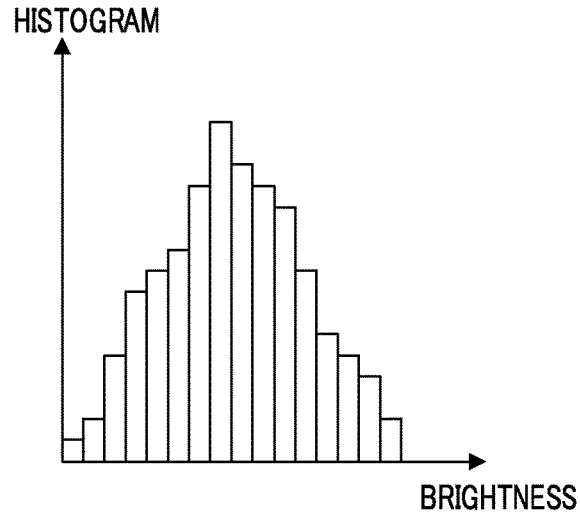

FIG. 10D illustrates a case before the brightness is changed, FIG. 10E illustrates a case in which the luminance gain at the time of display is decreased with respect to FIG. 10D, and FIG. 10F illustrates a case in which the combination ratio α is decreased with respect to FIG. 10D.

Figure 11:
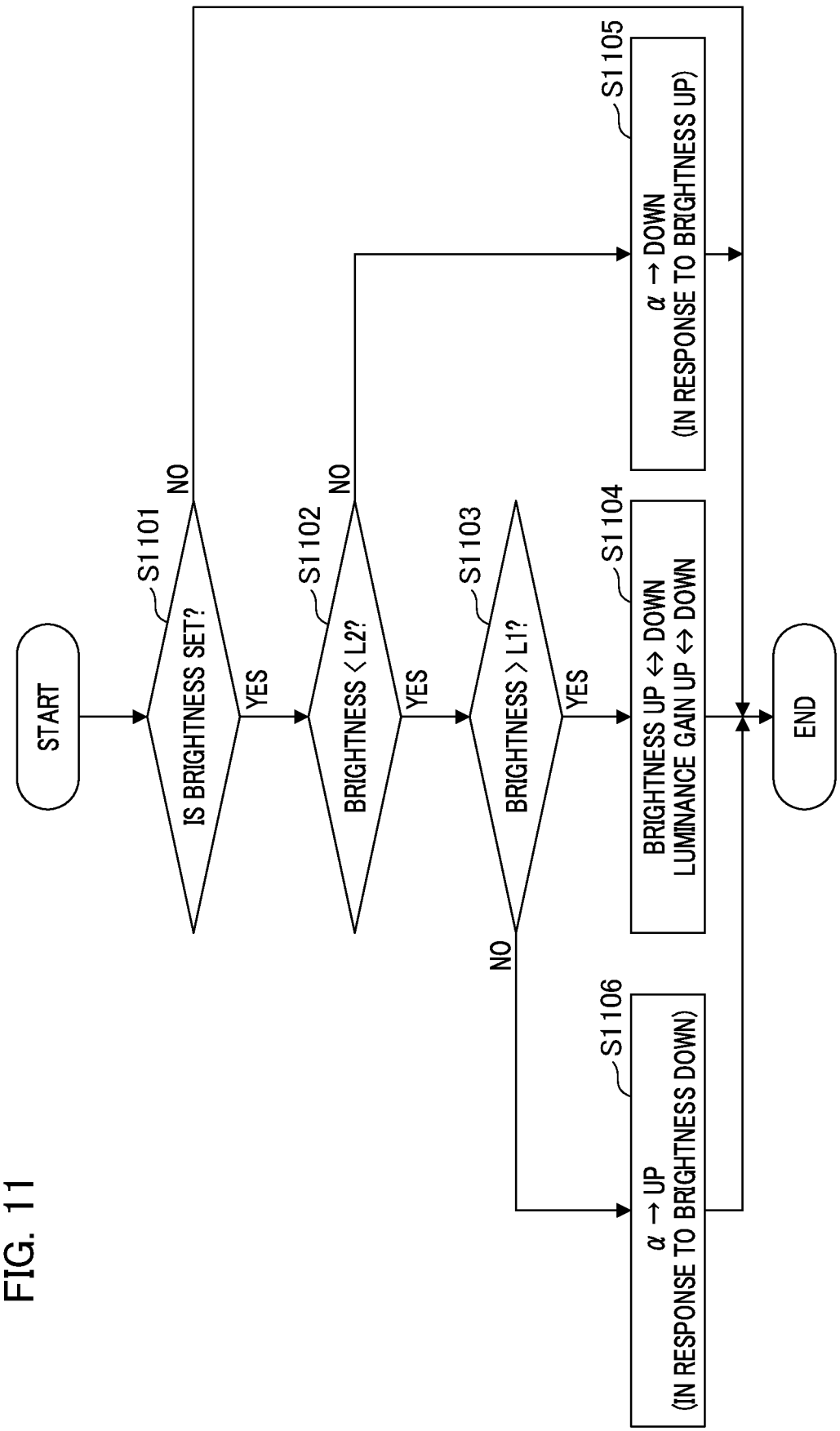
FIG. 11 is a flowchart illustrating setting of brightness according to a third embodiment.

FIG. 11 is a flowchart illustrating brightness setting according to the third embodiment. In S1101, it is first determined whether brightness is set. When the determination is Yes, it is determined in S1102 whether the changed brightness is less than a second luminance threshold L2.

When the determination is Yes, it is further determined whether the brightness changed in S1103 is greater than a first luminance threshold L1 (where L1<L2). When the determination is Yes in S1103, that is, the changed brightness is greater than the first saturation threshold L1 and less than the second luminance threshold L2, the luminance gain is increased or decreased in accordance with the increase or decrease of the setting of the changed brightness in S1104.

At this time, α is not changed. Conversely, when the determination is No in S1102, that is, the changed brightness is not less than the second luminance threshold L2, the combination ratio α is decreased in accordance with the increase in the setting of the changed brightness in S1105 and the third image signal 109 is close to the second image signal 108. Conversely, when the determination is NO in S1103, that is, the changed brightness is not greater than the first luminance threshold L1, the combination ratio α is increased in accordance with the decrease in the changed brightness in S1106 and the third image signal 109 is closer to the first image signal 107.

That is, the brightness is changed in accordance with the luminance gain within a range in which the reproducibility of the luminance of the grayscales is allowable, as in an imaging apparatus acquiring a normal visible-light image signal. With this configuration, it is possible to acquire an image with a less discomfort for the user predicting the same operation as that of an imaging apparatus acquiring a normal visible-light image signal. The luminance gain may be increased or decreased in accordance with not only α but also the increase or decrease in the luminance when the luminance is less than L1 or greater than L2 in the embodiment.

Fourth Embodiment

In a fourth embodiment, a similar configuration is applied to contrast when a user changes the setting of contrast of a displayed image. As described above, it is possible to obtain the third image signal 109 that has a more excellent SN ratio as the combination ratio α is smaller. Accordingly, it is possible to also view texture with a smaller luminance difference as the combination ratio α is smaller. That is, when the user increases contrast, it is possible to suppose that the user attempts to improve visibility of the texture.

Similarly to the change in the brightness illustrated in FIGS. 10A to 10F, information regarding luminance of intermediate grayscales is lost when contrast of an image is increased by changing the luminance gain at the time of display. That is, when the contrast of the image is increased by changing the luminance gain, visibility of texture with a large luminance difference is improved, but visibility of texture with a small luminance difference is not improved.

Conversely, when the contrast of the image is increased while improving the SN ratio of the image, it is possible to also view the texture with the small luminance difference. Accordingly, when the contrast is increased in accordance with the luminance gain at the time of display, it is possible to also view the texture with the small luminance difference when the combination ratio α is simultaneously decreased.

Here, when the user increases the contrast without exceeding a second contrast threshold D2, it is possible to determine that the user is satisfied with an improvement in only the visibility of the texture with the large luminance difference. On the other hand, when the user attempts to further increase the contrast beyond the second contrast threshold D2, it can be understood that the user attempts to improve not only the visibility of the large luminance difference but also the visibility of the texture with the small luminance difference.

Accordingly, in an imaging apparatus according to the fourth embodiment, the combination ratio α is not changed when the changed contrast is less than the second contrast threshold D2. Conversely, when the changed contrast is greater than the second contrast threshold D2, the combination ratio α is decreased and the third image signal 109 is close to the second image signal 108. With this configuration, it is possible to acquire an image with a less discomfort for the user predicting the same operation as that of an imaging apparatus acquiring a normal visible-light image signal.

When the user decreases the contrast, it is possible to suppose that the user desires to lower the visibility of the texture with the small luminance difference. When the contrast of the image is decreased by changing the luminance gain at the time of display, a grayscale difference in the texture with the large luminance difference is decreased, but remains as texture with the small grayscale.

Conversely, when the SN ratio of the image is simultaneously decreased while decreasing the contrast of the image, the texture with the large luminance difference is buried in noise. Accordingly, when the contrast is decreased in accordance with the luminance gain at the time of display, texture with the larger luminance difference is also buried in noise when the combination ratio α is simultaneously increased. Therefore, it is possible to lower the visibility.

Here, when the user decreases the contrast without exceeding the first contrast threshold D1, it is possible to determine that the user is satisfied with a decrease in only the visibility of the texture with the small luminance difference. On the other hand, when the user attempts to further decrease the contrast beyond a first contrast threshold D1, it can be understood that the user attempts to lower not only the visibility of the texture of the small luminance difference but also the visibility of the texture with the large luminance difference.

Figure 12:
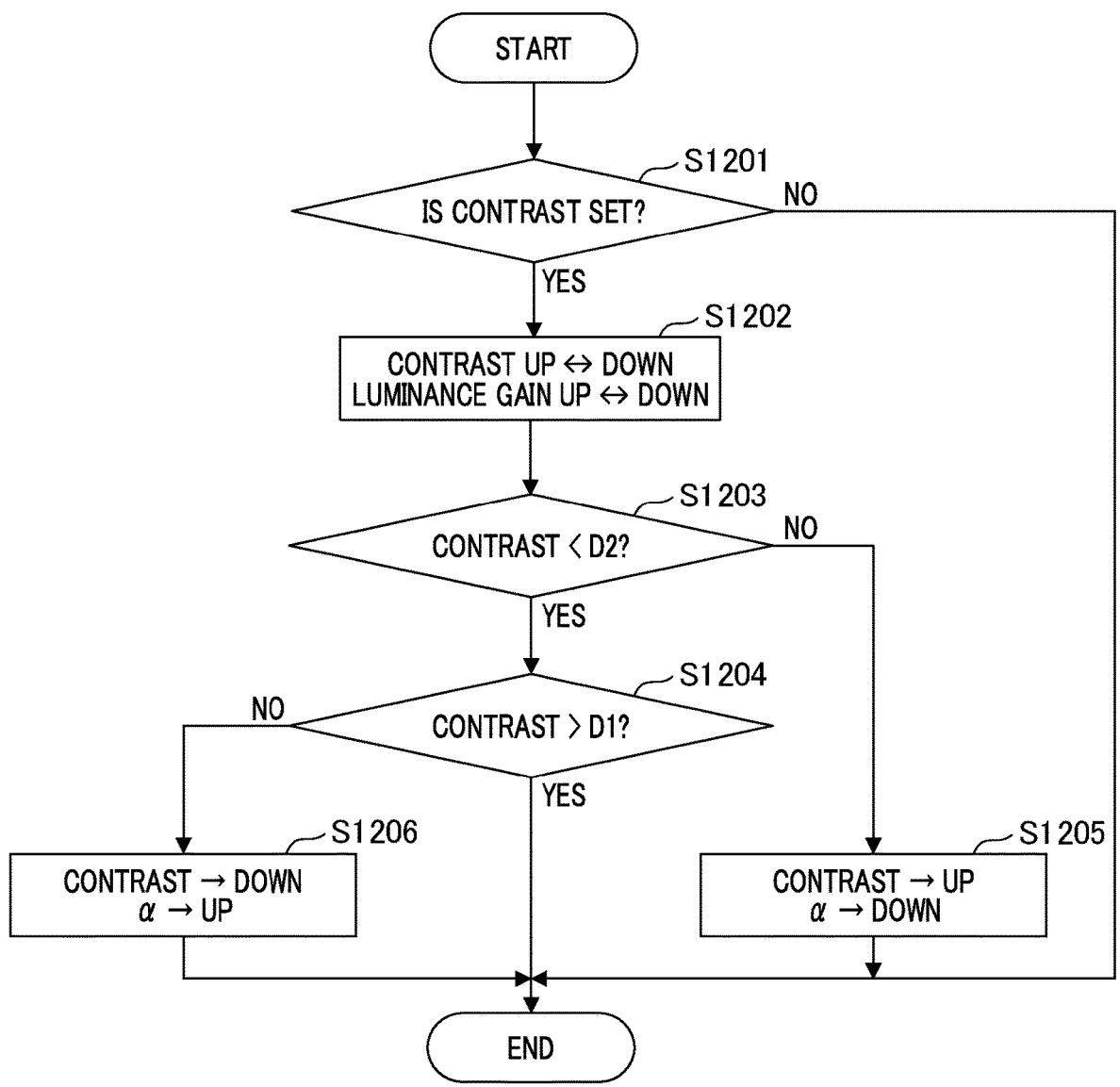
FIG. 12 is a flowchart illustrating setting of contrast according to a fourth embodiment.

Specifically, the process will be described. FIG. 12 is a flowchart illustrating contrast setting according to the fourth embodiment. In S1201, it is first determined whether contrast is set. When the determination is Yes, the luminance gain is increased or decreased in accordance with the increase or decrease of the setting of the contrast in S1202. Further, in S1203, it is determined whether the set contrast is less than the second contrast threshold D2.

When the determination is Yes, it is further determined in S1204 whether the set contrast is greater than the first contrast threshold D1 (where D1<D2). When the determination is Yes in S1204, the flow ends as it is. Conversely, when the determination is No in S1203, that is, the set contrast is not less than D2, the set contrast is increased and α is decreased in accordance with the increase in the set contrast in S1205. When the set contrast is not greater than D1 in S1204, the set contrast is decreased and α is increased in S1206.

As described above, in the imaging apparatus according to the fourth embodiment, the combination ratio α is not changed when the changed contrast is greater than D1 and less than D2. On the other hand, when the changed contrast is less than the first contrast threshold D1, the combination ratio α is increased and the third image signal 109 is close to the first image signal 107. With this configuration, it is possible to acquire an image with a less discomfort for the user predicting the same operation as that of an imaging apparatus acquiring a normal visible-light image signal.

As described above, in the imaging apparatus according to the second to fourth embodiment, the user does not change the combination ratio when the extent of the change in the color, the brightness, and the contrast is within the predetermined threshold range. Therefore, the same change in an image as that in an imaging apparatus acquiring a normal visible-light image signal is indicated. Conversely, when the extent of the change in the color, the brightness, and the contrast is out of the predetermined threshold range, the user also changes the combination ratio, and thus it is possible to obtain the third image signal 109 with a broad dynamic range which is not expressible with only gain adjustment of color or luminance.

The imaging apparatus according to the embodiments may be configured from a plurality of apparatuses connected to be able to communicate with each other via a network and a client apparatus such as surveillance camera. In this case, the client apparatus transmits various commands for controlling the imaging apparatus via the network. Upon receiving the commands, the imaging apparatus transmits responses to the commands or captured image data to the client apparatus.

The user can select photographing parameters of the imaging apparatus from the client apparatus.

The client apparatus is, for example, an external apparatus such as a PC or a smartphone and the network is configured as a wired LAN, a wireless LAN, or the like. Power may be supplied to the imaging apparatus via the network.

In the foregoing embodiment, light with different spectral characteristics is guided to the first and second image sensors by the optical separation unit 102. For example, filters with different spectral characteristics may be disposed before the first and second image sensors. The first and second image sensors may be a binocular image sensor that receives light via independent optical systems without passing through the optical separation unit 102.

Further, in the first and second image sensors, for example, a pixel in which a spectral characteristic filter for the first image sensor is disposed and a pixel in which a spectral characteristic filter for the second image sensor may be alternately disposed in one image sensor.

The preferred embodiments of the present invention have been described above, but the present invention is not limited to these embodiments and can be modified and changed in various forms within the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-175628, filed on Sep. 20, 2018, which is hereby incorporated by reference herein in its entirety.

What is claimed is:

1. An image processing device comprising:
a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal,
wherein the combination processing unit changes the combination ratio in accordance with a change in the parameter when the parameter setting unit changes the parameter, and
wherein, in a case where the parameter setting unit changes a parameter related to brightness of the combined image signal, the combination ratio of the infrared-light image signal in the combined image signal is increased.

2. An image processing device comprising:
a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal, the parameter is a parameter related to quality of the combined image signal,
wherein the combination processing unit changes the combination ratio in accordance with a change in the parameter when the parameter setting unit changes the parameter, and
wherein, in a case where the parameter setting unit changes a parameter related to a diaphragm of an imaging optical system provided in an imaging apparatus that generates the visible-light image signal and the infrared-light image signal, the combination ratio of the infrared-light image signal in the combined image signal is increased.

3. An image processing device comprising:
a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal, the parameter is a parameter related to quality of the combined image signal,
wherein the combination processing unit changes the combination ratio in accordance with a change in the parameter when the parameter setting unit changes the parameter, and
wherein, in a case where the parameter setting unit changes a parameter related to contrast of the combined image signal, the combination ratio of the infrared-light image signal in the combined image signal is increased.

4. The image processing device according to claim 1, wherein, when the parameter setting unit changes a parameter related to focus of an imaging optical system provided in an imaging apparatus that generates the visible-light image signal and the infrared-light image signal, the combination ratio of the infrared-light image signal in the combined image signal is increased.

5. The image processing device according to claim 1, wherein, when the parameter setting unit changes a parameter related to zoom of an imaging optical system provided in an imaging apparatus that generates the visible-light image signal and the infrared-light image signal, the combination ratio of the infrared-light image signal in the combined image signal is increased.

6. The image processing device according to claim 1, wherein, when the parameter setting unit changes a parameter related to a color of the combined image signal, the combination ratio of the visible-light image signal in the combined image signal is increased.

7. The image processing device according to claim 1, wherein, as an extent of the change in the parameter in the parameter setting unit is larger, an extent of the change in the combination ratios of the visible-light image signal and the infrared-light image signal in the combination processing unit is larger.

8. An image processing device comprising:
a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal, the parameter is a parameter related to quality of the combined image signal,
wherein the combination processing unit changes the combination ratio in accordance with a change in the parameter when the parameter setting unit changes the parameter, and
wherein, in a case where an extent of the change in the parameter in the parameter setting unit is less than a predetermined threshold, the combination ratios of the visible-light image signal and the infrared-light image signal in the combination processing unit are not changed.

9. The image processing device according to claim 8, wherein, when the parameter setting unit changes saturation of the combined image signal and the changed saturation is between a first threshold and a second threshold greater than the first threshold, the combination ratios are not changed,
when the changed saturation is less than the first threshold, the combination ratio of the infrared-light image signal in the combined image signal is increased, and
when the changed saturation is greater than the second threshold, the combination ratio of the visible-light image signal in the combined image signal is increased.

10. The image processing device according to claim 8, wherein, when the parameter setting unit changes brightness of the combined image signal and the changed brightness is between a first threshold and a second threshold greater than the first threshold, the combination ratios are not changed,
when the changed brightness is less than the first threshold, the combination ratio of the visible-light image signal in the combined image signal is increased, and
when the changed brightness is greater than the second threshold, the combination ratio of the infrared-light image signal in the combined image signal is increased.

11. The image processing device according to claim 8, wherein, when the parameter setting unit changes contrast of the combined image signal and the changed contrast is between a first threshold and a second threshold greater than the first threshold, the combination ratios are not changed,
when the changed contrast is less than the first threshold, the combination ratio of the visible-light image signal in the combined image signal is increased, and
when the changed contrast is greater than the second threshold, the combination ratio of the infrared-light image signal in the combined image signal is increased.

12. The image processing device according to claim 8, wherein the parameter setting unit includes a user interface and displays the predetermined threshold on the user interface.

13. The image processing device according to claim 8, wherein display of a user interface is changed in accordance with whether the extent of the change in the parameter is between first and second thresholds.

14. The image processing device according to claim 8, wherein, when the extent of the change in the parameter exceeds the first or second threshold, a predetermined display appears on a user interface.

15. An imaging apparatus comprising:
an imaging unit configured to generate a visible-light image signal and an infrared-light image signal; and
an image processing device,
wherein the image processing device comprises a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal, wherein the combination processing unit changes the combination ratio in accordance with a change in the parameter when the parameter setting unit changes the parameter, and wherein, in a case where the parameter setting unit changes a parameter related to brightness of the combined image signal, the combination ratio of the infrared-light image signal in the combined image signal is increased.

16. An image processing method comprising:
combining a visible-light image signal and an infrared-light image signal to generate a combined image signal; and
setting a parameter other than combination ratios of the visible-light image signal and the infrared-light image signal in the combined image signal,
wherein, in the combining of the visible-light image signal and the infrared-light image signal, the combination ratio is changed in accordance with a change in the parameter when the parameter is changed in the setting of the parameter, and
wherein, in a case where the setting the parameter changes a parameter related to brightness of the combined image signal, the combination ratio of the infrared-light image signal in the combined image signal is increased.

17. A non-transitory computer-readable storage medium storing a program for causing a computer to execute a method comprising:
combining a visible-light image signal and an infrared-light image signal to generate a combined image signal; and
setting a parameter other than combination ratios of the visible-light image signal and the infrared-light image signal in the combined image signal,
wherein, in the combining of the visible-light image signal and the infrared-light image signal, the combination ratio is changed in accordance with a change in the parameter when the parameter is changed in the setting of the parameter, and
wherein, in a case where the setting the parameter changes a parameter related to brightness of the combined image signal, the combination ratio of the infrared-light image signal in the combined image signal is increased.

18. An imaging apparatus comprising:
an imaging unit configured to generate a visible-light image signal and an infrared-light image signal; and
an image processing device,
wherein the image processing device comprises a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal,
wherein the combination processing unit changes the combination ratio in accordance with a change in the parameter when the parameter setting unit changes the parameter, and
wherein, in a case where the parameter setting unit changes a parameter related to a diaphragm of an imaging optical system provided in an imaging apparatus that generates the visible-light image signal and the infrared-light image signal, the combination ratio of the infrared-light image signal in the combined image signal is increased.

19. An imaging apparatus comprising:
an imaging unit configured to generate a visible-light image signal and an infrared-light image signal; and
an image processing device,
wherein the image processing device comprises a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal,
wherein the combination processing unit changes the combination ratio in accordance with a change in the parameter when the parameter setting unit changes the parameter, and
wherein, in a case where the parameter setting unit changes a parameter related to contrast of the combined image signal, the combination ratio of the infrared-light image signal in the combined image signal is increased.

20. An imaging apparatus comprising:
an imaging unit configured to generate a visible-light image signal and an infrared-light image signal; and
an image processing device,
wherein the image processing device comprises a controller having a processor which executes instructions stored in a memory or having circuitry, the controller being configured to function as:
a combination processing unit configured to combine a visible-light image signal and an infrared-light image signal to generate a combined image signal, and
a parameter setting unit configured to set a parameter other than combination ratios of the visible-light image signal and the infrared-light image signal in the combined image signal,
wherein the combination processing unit changes the combination ratio in accordance with a change in the parameter when the parameter setting unit changes the parameter, and
wherein, in a case where an extent of the change in the parameter in the parameter setting unit is less than a predetermined threshold, the combination ratios of the visible-light image signal and the infrared-light image signal in the combination processing unit are not changed.

21. An image processing method comprising:
combining a visible-light image signal and an infrared-light image signal to generate a combined image signal; and
setting a parameter other than combination ratios of the visible-light image signal and the infrared-light image signal in the combined image signal,
wherein, in the combining of the visible-light image signal and the infrared-light image signal, the combination ratio is changed in accordance with a change in the parameter when the parameter is changed in the setting of the parameter, and
wherein, in a case where the setting the parameter changes a parameter related to a diaphragm of an imaging optical system provided in an imaging apparatus that generates the visible-light image signal and the infrared-light image signal, the combination ratio of the infrared-light image signal in the combined image signal is increased.

22. An image processing method comprising:

combining a visible-light image signal and an infrared-light image signal to generate a combined image signal; and setting a parameter other than combination ratios of the visible-light image signal and the infrared-light image signal in the combined image signal, wherein, in the combining of the visible-light image signal and the infrared-light image signal, the combination ratio is changed in accordance with a change in the parameter when the parameter is changed in the setting of the parameter, and wherein, in a case where the setting the parameter changes a parameter related to contrast of the combined image signal, the combination ratio of the infrared-light image signal in the combined image signal is increased.

23. An image processing method comprising:

combining a visible-light image signal and an infrared-light image signal to generate a combined image signal; and setting a parameter other than combination ratios of the visible-light image signal and the infrared-light image signal in the combined image signal, wherein, in the combining of the visible-light image signal and the infrared-light image signal, the combination ratio is changed in accordance with a change in the parameter when the parameter is changed in the setting of the parameter, and wherein, in a case where an extent of the change in the parameter in the setting the parameter is less than a predetermined threshold, the combination ratios of the visible-light image signal and the infrared-light image signal in the combining of the visible-light image signal and the infrared-light image signal are not changed.

24. A non-transitory computer-readable storage medium storing a program for causing a computer to execute a method comprising:

combining a visible-light image signal and an infrared-light image signal to generate a combined image signal; and setting a parameter other than combination ratios of the visible-light image signal and the infrared-light image signal in the combined image signal, wherein, in the combining of the visible-light image signal and the infrared-light image signal, the combination ratio is changed in accordance with a change in the parameter when the parameter is changed in the setting of the parameter, and wherein, in a case where the setting the parameter changes a parameter related to a diaphragm of an imaging optical system provided in an imaging apparatus that generates the visible-light image signal and the infrared-light image signal, the combination ratio of the infrared-light image signal in the combined image signal is increased.

25. A non-transitory computer-readable storage medium storing a program for causing a computer to execute a method comprising:

combining a visible-light image signal and an infrared-light image signal to generate a combined image signal; and setting a parameter other than combination ratios of the visible-light image signal and the infrared-light image signal in the combined image signal, wherein, in the combining of the visible-light image signal and the infrared-light image signal, the combination ratio is changed in accordance with a change in the parameter when the parameter is changed in the setting of the parameter, and wherein, in a case where the setting the parameter changes a parameter related to contrast of the combined image signal, the combination ratio of the infrared-light image signal in the combined image signal is increased.

26. A non-transitory computer-readable storage medium storing a program for causing a computer to execute a method comprising:

combining a visible-light image signal and an infrared-light image signal to generate a combined image signal; and setting a parameter other than combination ratios of the visible-light image signal and the infrared-light image signal in the combined image signal, wherein, in the combining of the visible-light image signal and the infrared-light image signal, the combination ratio is changed in accordance with a change in the parameter when the parameter is changed in the setting of the parameter, and wherein, in a case where an extent of the change in the parameter in the setting the parameter is less than a predetermined threshold, the combination ratios of the visible-light image signal and the infrared-light image signal in the combining of the visible-light image signal and the infrared-light image signal are not changed.

* * * * *